United States Patent Office 3,328,484
Patented June 27, 1967

3,328,484
POLYPROPYLENE OR POLYESTER COMPOSITIONS OF IMPROVED DYEABILITY CONTAINING A LINEAR POLYAMIDE AND A LINEAR SULFONATED POLYAMIDE
Maurice Alliot-Lugaz and Pierre Allard, Lyon, France, assignor to Societe Rhodiaceta, Paris, France, a French body corporate
No Drawing. Filed Feb. 10, 1964, Ser. No. 343,465
Claims priority, application France, Jan. 3, 1963, 920,376
19 Claims. (Cl. 260—857)

This application is a continuation-in-part of our application Ser. No. 332,894, filed Dec. 23, 1963, now abandoned.

This invention relates to spinnable and film-forming compositions of improved dyeability containing a major proportion of polypropylene or a synthetic linear polyester and the shaped articles obtained therefrom.

Synthetic linear polyesters derived from aromatic dicarboxylic acids can be used to produce oriented structures, such as yarns, fibres and films, which are difficult to dye by conventional methods, because the dyeing affinity of the polyester is low or nonexistent.

One of the simplest of the many processes developed for improving the affinity of polyesters for dyes consists in incorporating in the polyesters, before extrusion from 3% to 7% of a polyoxamide containing a tertiary nitrogen atom in its chain. These compositions give fibres which, as compared with unmodified polyester fibres, have an improved affinity for acid dyes. However, dark shades cannot be obtained using such modified polyesters, and the colours are in fact scarcely deeper than those obtained on yarns obtained from unmodified polyesters.

Crystalline polypropylenes, prepared by polymerisation of propylene in the presence of steresospecific catalysts, may be converted into oriented structures such as yarns, fibres and films which possess excellent mechanical properties. However, the development of these various applications has not up to the present been so far-reaching as might have been expected. This is because of the difficulty of dyeing these structures, which has not yet been satisfactorily resolved.

A number of solutions have already been proposed. For example, it has been suggested to use either special dyes or special dyeing methods. Attempts have also been made to increase the affinity of polypropylene for dyes by incorporating an adjuvant which may be, for example, a dicarboxylic acid, a halogenated aliphatic compound, or a modifying polymer. If a modifying polymer is employed, difficulties in compatibility are frequently encountered. For example, when attempts are made to prepare compositions based on polypropylene and polyhexamethylene adipamide, it is found that it is necessary to use mixing techniques using high pressures, which are complex and expensive.

The present invention provides compositions of improved dyeability with disperse, basic, acidic, and metallized dyestuffs which comprise (A) a major proportion by weight of crystalline polypropylene or a synthetic linear polyester derived from an aromatic dicarboxylic acid and an aliphatic or cycloaliphatic diol, and (B) a minor proportion by weight of a mixture of (i) a synthetic linear polyamide or copolyamide and (ii) not more than an equal weight of a synthetic linear copolyamide of which 5% to 35% by weight consists of units of the formula:

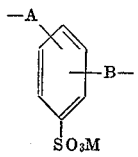

in which A and B, which may be the same or different, are each —CO— or —NH—, and M is an alkali metal. The polypropylene or synthetic linear polyester is hereinafter referred to as "the major connstituent." The proportion of the major constituent in the compositions is preferably from 70% to 95% by weight.

The polyesters are obtained from aromatic dicarboxylic acids or their diesters, especially those of the formula:

$$R_1O—CO—(CH_2)_n—Ar—(CH_2)_m—COOR_2$$

in which $R_1$ and $R_2$ represent hydrogen atoms or alkyl groups containing from 1 to 10 carbon atoms, $n$ and $m$ each represent an integer from 0 to 4, and Ar represents a divalent aromatic radical, and glycols, preferably polymethylene glycols containing from 2 to 8 carbon atoms or cis- or trans-cycloaliphatic diols.

The melt viscosity of the polypropylene, measured in accordance with the standard ASTM D–1328–52 T, may vary between wide limits but, in order that the preparation and conversion of these compositions may not necessitate excessive temperatuers or pressures, use is ordinarily made of polypropylene whose melt viscosity is between 0.1 and 8 and especially from 0.5 to 2.

The mixture of polyamides consists, at least to the extent of one half, of a synthetic, linear polyamide or copolyamide, derived from at least one amino-carboxylic acid, or at least one salt of a dicarboxylic acid and a diamine, or both. As preferred examples of such polyamides, there may be mentioned polycaprolactam, polyhexamethylene adipamide, a copolyamide from hexamethylene diamine adipate and sebacate, and a copolyamide from hexamethylene diamine adipate and caprolactam.

The sulphonated synthetic, linear copolyamide (ii), which preferably makes up 10 to 50% by weight of the mixture (B), preferably contains in its chain units of the formula:

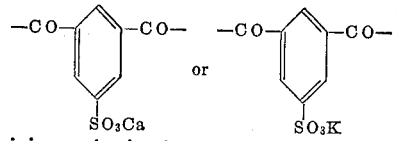

the remaining units in the copolyamide chain being derived from hexamethylene diamine, and either adipic or isophthalic acid.

The ternary compositions of the invention have many advantages over known binary compositions prepared from polyamides and polyesters or polypropylene. If, in the known binary compositions, the polyamides employed are ordinary polyamides, the compositions obtained give yarns which have only a small superiority in dyeing affinity to unmodified polyester yarns. With polypropylene, a considerable increase in dyeability is observed with acid dyes but difficulties in preparing the compositions are encountered. On the other hand, if the polyamides are sulphonated polyamides, the compositions obtained are difficult to extrude, because the compatibility of the polymers is not very good, and the yarns, obtained therefrom using the special techniques necessary have affinity only for basic dyes.

In contrast, the ternary compositions of the present invention are very homogeneous and are similar to true alloys. Yarns, films and fibres obtained therefrom have, moreover, an affinity not only for basic dyes but also for acidic, metallized and disperse dyes. The mechanical properties of the yarns and fibres obtained from the ternary compositions of the invention are not appreciably different from those of yarns and fibres made of the major constituent only. The tendency to pill, observed on fabrics obtained from pure or blended polyester fibres, is much less marked on fabrics obtained from fibres prepared by extrusion of the compositions of the present invention. More over, the thermal aging resistance of polypropylene-containing filaments of the invention is appreciably higher than that of filaments of pure polyproylene or of the known binary polypropylene compositions.

The following examples illustrate the invention. The percentages are by weight.

EXAMPLE 1

There are prepared by malaxation at 270° C. in a malaxator of the "Komalaxeur Buss" type compositions comprising, by weight:

(A) 80% of ethylene polyterephthalate and 20% of a copolyamide obtained by polycondensation of 45% of hexamethylene diamine adipate and 55% of hexamethylene diamine sebacate;

(B) 95% of ethylene polyterephthalate and 5% of a sulphonated copolyamide obtained by polycondensation of 60% of hexamethylene diamine adipate and 40% of hexamethylene diamine m-(potassium sulpho)-isophthalate; and (C) 80% of ethylene polyterephthalate, 5% of the sulphonated copolyamide defined for (B) and 15% of copolyamide similar to that defined for (A).

After granulation, these compositions are extruded at 295° C. through a 7-hole nozzle. The filaments obtained are stretched at 100 m./min. 3.8 times.

Yarns of ethylene polyterephthalate, referred to as (D), are also prepared under similar conditions.

Specimens of these various yarns are dyed at 100° C. in a bath containing 2% of the basic dye marketed under the trade name Bleu Basacryl GL, Basic blue 54 (Colour Index S. 175—1963). Yarns A and D are dyed dull white. Yarn B is dyed blue, and yarn C is dyed an intense blue.

EXAMPLE 2

There are prepared by malaxation the following compositions comprising, by weight:

(A) 80% of ethylene polyterephthalate, 5% of a sulphonated copolyamide obtained by polycondensation of 60% of hexamethylene diamine adipate and 40% of hexamethylene diamine m-(potassium sulpho)-isophthalate, and 15% of a copolyamide obtained by polycondensation of 80% of hexamethylene diamine adipate and 20% of hexamethylene diamine sebacate;

(B) 80% of ethylene polyterephthalate, 5% of a sulphonated polyamide identical to that defined under (A), and 15% of a copolyamide obtained by polycondensation of 80% of hexamethylene diamine adipate and 20% of caprolactam.

These compositions are extruded at 280° C. to form yarns, which are then stretched 4 times. Under substantially identical conditions, a yarn of ethylene polyterephthalate, referred to as (C) is prepared.

Specimens of each of these yarns are dyed at 130° C. in a bath comprising 2% of the basic dye marketed under the trade name Bleu Basacryl GL. A dark blue-violet coloration is obtained on the yarns (A) and (B), but yarn (C) is only dyed slightly pink.

EXAMPLE 3

There are prepared by malaxation the following compositions comprising, by weight:

(A) 80% of ethylene polyterephthalate, 5% of a sulphonated copolyamide obtained by polycondensation of 90% of hexamethylene diamine isophthalate and 10% of hexamethylene diamine m-(potassium sulpho) - isophthalate, and 15% of a copolyamide obtained by polycondensation of 45% of hexamethylene diamine adipate and 55% of hexamethylene diamine sebacate;

(B) 80% of ethylene polyterephthalate and 20% of the unsulphonated copolyamide defined under (A).

These compositions are extruded between 265° and 285° C. through a 7-hole nozzle and the yarns obtained are stretched. Yarns of ethylene polyterephthalate, referred to as (C), are prepared under similar conditions. The dynamometric properties of the yarns obtained are as follows:

| Yarn | Extent of stretch | Strength in g./denier | Elongation, percent |
|---|---|---|---|
| A | 5.4 | 3.76 | 10 |
| B | 5.8 | 4.60 | 11 |
| C | 5.8 | 5.33 | 21 |

Specimens of each of these filaments are dyed without carriers in baths comprising:

I. 2% of the acid dye marketed under the trade name Bleu Acilane direct A (Colour Index (1956) Acid Blue 77);

II. 2% of the metalliferous dye marketed under the trade name Bleu Cibalane BL (Colour Index (1956) Acid Blue No. 168); and III. 2% of the basic dye marketed under the trade name Bleu Basacryl GL.

The dyeings are carried out at 100° C. for bath I, and at 130° C. for baths II and III, and the following results are obtained:

| Yarn | Acid dye | Metalliferous dye | Basic dye |
|---|---|---|---|
| C | White | Pale mauve | Pink. |
| A | Light blue | Dark violet-blue | Dark violet-blue. |
| B | Pale blue | do | Pink. |

EXAMPLE 4

The following compositions are prepared as in the preceding examples:

(A) 74% of polyethylene terephthalate, 15% of a copolyamide prepared from 45% of hexamethylene diamine adipate and 55% of hexamethylene diamine sebactate, and 11% of a sulphonated copolyamide prepared by polycondensation of 90% of hexamethylene diamine isophthalate and 10% of hexamethylene diamine m-(potassium sulpho)-isophthalate;

(B) 74% of ethylene polyterephthalate, 15% of a copolyamide prepared from 80% by weight of hexamethylene diamine adipate and 20% by weight of caprolactam, and 11% by weight of the sulphonated copolyamide defined under (A).

Yarns are prepared by microspinning these compositions, and also standard polyethylene terephthalate. Specimens of these yarns are dyed at 100° C. in a bath comprising 1% of the disperse dye marketed under the trade name Bleu Latyl FL (Disperse Blue 27, Colour Index S. 210—1963). An intense blue coloration is observed on yarns A and B, while the standard remains substantially undyed.

EXAMPLE 5

Mixtures are prepared from:

(A) a crystalline polypropylene having a melt viscosity of 1.2; and (B) a mixture of (i) a copolyamide obtained by polycondensation of 45% by weight of hexamethylene diamine adipate and 55% by weight of hexamethylene diamine sebacate, and (ii) a sulphonated copolyamide obtained by polycondensation of 60% by weight of hexamethylene diamine adipate and 40% by weight of hexamethylene diamine m-(potassium sulpho)-isophthalate.

The constituents are mixed as grains, ground in an apparatus of the "Lancellin" type, and then malaxated in a micro-malaxator at temperatures between 165° and 275° C. The compositions obtained are extruded at 310° C. through a spinneret having 7 holes, each 0.3 mm. in diameter. After cooling, the filaments are stretched four times on a finger heated to 90° C.

The filaments are dyed in baths containing 5% of o-phenylphenol, and either (I) 3% of Bleu Latyl FL, a disperse dye marketed by E. I. du Pont de Nemours and Company, Disperse Blue 27 (C.I. S. 210—1963); or (II) 3% of Rouge Basacryl GL, a basic dye marketed by B.A.S.F. Basic Red 29 (C.I. S. 163—1963); or (III) 3% of Rouge Vialon Solide B, a metalliferous dye marketed by B.A.S.F. (C.I. No. 225, 2nd edition, 1956); or (IV) 3% of Bleu Pur Lanasyne GL, an acid dye marketed by Sandoz (C.I. No. 127, 2nd edition, 1956), and the colours of the filaments obtained are given in the following table.

| Proportions of the constituents in the compositions from which the filaments are made | Dye I | Dye II | Dye III | Dye IV |
|---|---|---|---|---|
| 100% A | Undyed | Very light pink | Undyed | Undyed. |
| 90% A/10% B(i) | Blue | Light pink | Dark red | Light blue. |
| 87% A 10% B(i)/3% B(ii) | Dark blue | Dark red | do | Dark blue. |
| 87% A/7% B(i) 6% B(ii) | | Bright red | do | Medium blue. |

EXAMPLE 6

Under conditions identical with those of Example 5, filaments are prepared from compositions containing the following polymers:

(A) polypropylene having a melt viscosity of 1.2;

(B)(i) a copolyamide obtained by polycondensation of 22% by weight of hexamethylene diamine adipate and 78% by weight of caprolactam; and (ii) a sulphonated copolyamide identical with that used in Example 1.

These filaments are dyed as in Example 5 with dyes II and IV, and the colours of the filaments obtained are shown in the following table.

| Proportions of the constituents in the compositions from which the filaments are made | Dye II | Dye IV |
|---|---|---|
| 100% A | Very light pink | Undyed. |
| 87% A/10% B(i)/3% B(ii) | Dark red | Medium blue. |

The fastness of the shades obtained to friction and light is very good.

EXAMPLE 7

A composition is prepared from: 87 parts by weight of polypropylene having a melt viscosity of 0.8, 10 parts by weight of a copolyamide obtained by polycondensation of 22% by weight of hexamethylene diamine adipate and 78% by weight of caprolactam and 3 parts by weight of the sulphonated copolyamide described in Example 5, by crushing and malaxation in an apparatus of the "Komalaxeur Buss" type, at 165–237° C.

This composition is extruded at 400 m./min. through a spinnerete maintained at 300° C., and the filaments obtained are stretched 4.6 times at 240 m./min. A specimen of these filaments is dyed in a bath comprising 5% by weight of orthophenylphenol and 3% by weight of Rouge Astrazon DBL, marketed by the company Bayer (C.I. Basic Violet 7, 2nd edition, 1956), and they are coloured a bright red colour, whereas filaments of pure polypropylene are scarcely dyed at all.

The filaments obtained in this example have a breaking strength of 6.35 g./denier at an elongation of 16.2%. Filaments of pure polypropylene prepared under similar conditions have a strength of 6.22 g./denier and an elongation of 26%. In addition, when filaments of pure polypropylene are subjected to thermal aging in an oven at 110° C., they are degraded at the end of 4 days, while filaments made from the ternary composition of Example 7 are degraded only after 33 days.

We claim:

1. Compositions of improved dyeability which comprise (A) a major proportion by weight of a polymer selected from the class consisting of crystalline polypropylene and a synthetic linear polyester derived from an aromatic dicarboxylic acid and a diol selected from the class consisting of aliphatic and cycloaliphatic diols, and (B) a minor proportion by weight of a mixture of (i) a synthetic, linear polyamide, and (ii) not more than an equal weight of a synthetic, linear copolyamide of which 5% to 35% by weight consists of units of the formula:

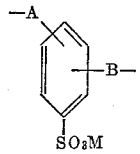

in which A and B are each selected from the class consisting of —CO— and —NH—, and M is an alkali metal.

2. Polyester compositions which comprise (A) a major proportion by weight of a synthetic linear polyester derived from an aromatic dicarboxylic acid and a diol selected from the class consisting of aliphatic and cycloaliphatic diols, and (B) a minor proportion by weight of a mixture of (i) a synthetic, linear polyamide, and (ii) not more than an equal weight of a synthetic, linear copolyamide of which 5% to 35% by weight consists of units of the formula:

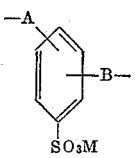

in which A and B are each selected from the class consisting of —CO— and —NH—, and M is an alkali metal.

3. Polypropylene compositions which comprise (A) a major proportion by weight of crystalline polypropylene, and (B) a minor proportion by weight of a mixture of (i) a synthetic, linear polyamide, and (ii) not more than an equal weight of a synthetic, linear copolyamide of which 5% to 35% by weight consists of units of the formula:

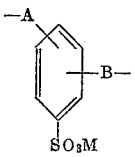

in which A and B are each selected from the class consisting of —CO— and —NH—, and M is an alkali metal.

4. Polyester compositions as claimed in claim 2 comprising 70 to 95% by weight of the synthetic linear polyester.

5. Polypropylene compositions as claimed in claim 3 comprising 70 to 95% by weight of crystalline polypropylene.

6. Polyester compositions as claimed in claim 2 in which the synthetic linear polyester is polyethylene terephthalate.

7. Polypropylene compositions as claimed in claim 3 in which the melt viscosity of the polypropylene is 0.5 to 2.

8. Polyester compositions as claimed in claim 2 in which the mixture (B) comprises 10 to 50% by weight of the copolyamide (ii).

9. Polypropylene compositions as claimed in claim 3 in which the mixture (B) comprises 10 to 50% by weight of the copolyamide (ii).

10. Polyester compositions as claimed in claim 2 in which the synthetic linear polyamide (i) is selected from the class consisting of polycaprolactam, polyhexamethylene adipamide, a copolyamide from hexamethylene diamine adipate and sebacate, and a copolyamide from hexamethylene diamine adipate and caprolactam.

11. Polypropylene compositions as claimed in claim 3 in which the synthetic linear polyamide (i) is selected from the class consisting of polycaprolactam, polyhexamethylene adipamide, a copolyamide from hexamethylene diamine adipate and sebacate, and a copolyamide from hexamethylene diamine adipate and caprolactam.

12. Polyester compositions as claimed in claim 2 in which the synthetic linear copolyamide (ii) is derived from an isophthalate selected from the class consisting of hexamethylene diamine m-(sodium and potassium sulpho)-isophthalates and a hexamethylene diamine salt selected from the class consisting of hexamethylene diamine adipate and hexamethylene diamine isophthalate.

13. Polypropylene compositions as claimed in claim 3 in which the synthetic linear copolyamide (ii) is derived from an isophthalate selected from the class consisting of hexamethylene diamine m-(sodium and potassium sulpho)-isophthalates and from hexamethylene diamine adipate.

14. Polyester compositions which comprise (A) 70 to 95% by weight of polyethylene terephthalate, and (B) 5 to 30% by weight of a mixture of (i) 55 to 90% by weight of a synthetic linear polyamide selected from the class consisting of polycaprolactam, polyhexamethylene adipamide, a copolyamide from hexamethylene diamine adipate and sebacate and a copolyamine from hexamethylene diamine adipate and caprolactam, and (ii) 10 to 45% by weight of a synthetic linear copolyamide selected from the class consisting of copolyamides derived from an isophthalate selected from the class consisting of hexamethylene diamine m-(sodium and potassium sulpho)-isophthalates and a hexamethylene diamine salt selected from the class consisting of hexamethylene diamine adipate and hexamethylene diamine isophthalate, 5 to 35% by weight of the said copolyamide consisting of units of the formula:

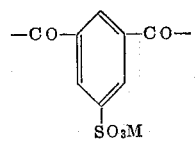

in which M is an alkali metal selected from the class consisting of sodium and potassium.

15. Polyester compositions and shaped articles made therefrom dyed with a dyestuff selected from the class consisting of disperse, basic, acidic, and metallized dyestuffs, said polyester composition comprising (A) a major proportion by weight of a synthetic linear polyester derived from an aromatic dicarboxylic acid and a diol selected from the class consisting of aliphatic and cycloaliphatic diols, and (B) a minor proportion by weight of a mixture of (i) a synthetic, linear polyamide, and (ii) not more than an equal weight of a synthetic, linear copolyamide of which 5% to 35% by weight consists of units of the formula:

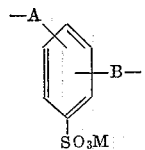

in which A and B are each selected from the class consisting of —CO— and —NH—, and M is an alkali metal.

16. Polyester compositions and shaped articles made therefrom dyed with a dyestuff selected from the class consisting of disperse, basic, acidic, and metallized dyestuffs, said polyester composition comprising (A) 70 to 95% by weight of a polyethylene terephthalate, and (B) 5 to 30% by weight of a mixture of (i) 55 to 90% by weight of a synthetic linear polyamide selected from the class consisting of polycaprolactam, polyhexamethylene adipamide, a copolyamide from hexamethylene diamine adipate and sebacate and a copolyamide from hexamethylene diamine adipate and caprolactam, and (ii) 10 to 45% by weight of a synthetic linear copolyamide selected from the class consisting of copolyamides derived from an isophthalate selected from the class consisting of hexamethylene diamine m-(sodium and potassium sulpho)-isophthalates and a hexamethylene diamine salt selected from the class consisting of hexamethylene diamine adipate and hexamethylene diamine isophthalate, 5 to 35% by weight of the said copolyamide consisting of units of the formula:

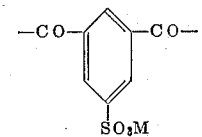

in which M is an alkali metal selected from the class consisting of sodium and potassium.

17. Polypropylene compositions which comprise (A) 70 to 95% by weight of crystalline polypropylene of melt viscosity 0.5 to 2, and (B) 5 to 30% by weight of a mixture of (i) 50 to 90% by weight of a synthetic linear polyamide selected from the class consisting of polycaprolactam, polyhexamethylene adipamide, a copolyamide from hexamethylene diamine adipate and sebacate, and a copolyamide from hexamethylene diamine adipate and caprolactam, and (ii) 10 to 40% by weight of a synthetic linear copolyamide selected from the class consisting of copolyamides derived from an isophthalate selected from the class consisting of hexamethylene diamine m-(sodium and potassium sulpho)-isophthalates and from hexamethylene diamine adipate, 5 to 35% by weight of the said copolyamide consisting of units of the formula:

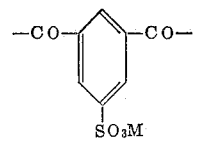

in which M is an alkali metal selected from the class consisting of sodium and potassium.

18. Polypropylene compositions and shaped articles made therefrom dyed with a dyestuff selected from the class consisting of disperse, basic, acidic, and metallized dyestuffs, said polypropylene compositions comprising (A) a major proportion by weight of crystalline propylene, and (B) a minor proportion by weight of a mixture of (i) a synthetic, linear polyamide, and (ii) not more than an equal weight of a synthetic, linear copolyamide of which 5% to 35% by weight consists of units of the formula

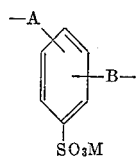

in which A and B are each selected from the class consisting of —CO— and —NH—, and M is an alkali metal.

19. Polypropylene compositions and shaped articles made therefrom with a dyestuff selected from the class consisting of disperse, basic, acidic, and metallized dyestuffs, said polypropylene compositions comprising (A) 70 to 95% by weight of crystalline polypropylene of melt viscosity 0.5 to 2, and (B) 5 to 30% by weight of a mixture of (i) 50 to 90% by weight of a synthetic linear polyamide selected from the class consisting of polycaprolactam, polyhexamethylene adipamide, a copolyamide from hexamethylene diamine adipate and sebacate, and a copolyamide from hexamethylene diamine adipate and caprolactam, and (ii) 10 to 40% by weight of a synthetic linear copolyamide selected from the class consisting of copolyamides derived from an isophthalate selected from the class consisting of hexamethylene diamine m-(sodium and potassium sulpho)-isophthalates and from hexamethylene diamine adipate, 5 to 35% by weight of the said copolyamide consisting of units of the formula:

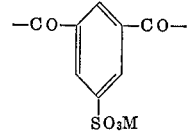

in which M is an alkali metal selected from the class consisting of sodium and potassium.

References Cited

UNITED STATES PATENTS

| | | | |
|---|---|---|---|
| 3,039,990 | 6/1962 | Huffman | 260—857 |
| 3,107,228 | 10/1963 | Cappuccio | 260—857 |
| 3,161,608 | 12/1964 | Caldwell | 260—857 |
| 3,235,623 | 2/1966 | Hacquard | 260—857 |

FOREIGN PATENTS

| | | |
|---|---|---|
| 1,143,635 | 2/1963 | Germany. |
| 1,284,591 | 2/1961 | France. |

MURRAY TILLMAN, *Primary Examiner.*

P. LIEBERMAN, *Assistant Examiner.*